(12) United States Patent
Uemoto et al.

(10) Patent No.: US 7,597,958 B2
(45) Date of Patent: Oct. 6, 2009

(54) BLACK MAGNETIC IRON OXIDE PARTICLES HAVING A SPECIFIC DISSOLUTION OF SULFUR ELEMENT

(75) Inventors: Shinji Uemoto, Otake (JP); Naoki Uchida, Otake (JP); Mamoru Kamigaki, Otake (JP); Ryo Iwai, Otake (JP); Hiromitsu Misawa, Otake (JP); Koso Aoki, Otake (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 12/071,389

(22) Filed: Feb. 20, 2008

(65) Prior Publication Data

US 2008/0206566 A1  Aug. 28, 2008

(30) Foreign Application Priority Data

Feb. 23, 2007  (JP)  ............................. 2007-044458

(51) Int. Cl.
*B32B 5/16*  (2006.01)

(52) U.S. Cl. ....................... 428/402; 428/702; 428/704; 428/900

(58) Field of Classification Search ................. 428/402, 428/702, 704, 900
See application file for complete search history.

(56) References Cited

U.S. PATENT DOCUMENTS

| | | | | |
|---|---|---|---|---|
| 6,638,674 B2 * | 10/2003 | Komoto et al. | ........... | 430/106.1 |
| 6,653,035 B2 * | 11/2003 | Komoto et al. | ........... | 430/106.1 |
| 6,780,555 B2 * | 8/2004 | Uchida et al. | ............ | 430/106.2 |
| 2007/0254157 A1 * | 11/2007 | Uchida et al. | ............... | 428/403 |

* cited by examiner

*Primary Examiner*—H. (Holly) T Le
(74) *Attorney, Agent, or Firm*—Nixon & Vanderhye P.C.

(57) ABSTRACT

The present invention relates to a black magnetic iron oxide particles each having a polyhedral shape wherein when a percentage of dissolution of iron element based on a total amount of iron element contained in the black magnetic iron oxide particles is 50%, a percentage of dissolution of sulfur element based on a total amount of sulfur element contained in the black magnetic iron oxide particles is less than 40%.

5 Claims, No Drawings

BLACK MAGNETIC IRON OXIDE PARTICLES HAVING A SPECIFIC DISSOLUTION OF SULFUR ELEMENT

BACKGROUND OF THE INVENTION

The present invention relates to black magnetic iron oxide particles each having a polyhedral shape comprising magnetite particles having a high blackness.

When using the black magnetic iron oxide particles of the present invention, it is possible to produce a magnetic toner having a high blackness.

As one of the conventional methods for developing electrostatic latent images, there is extensively known and used such a developing method using a so-called "one component system magnetic toner" in which composite particles prepared by mixing and dispersing magnetic particles such as magnetite particles in a resin without using any carrier are used as a developer.

In recent years, with enhancement in performance of electrostatic copying machines, there is an increasing demand for a magnetic toner having a higher blackness as a developer.

The blackness of the magnetic toner largely depends upon a blackness of magnetite to be contained in the magnetic toner. In order to allow the magnetite to exhibit a sufficient blackness when incorporated into the magnetic toner, it is important that a coating film, in particular, a thin coating film, which is formed by using the magnetite, has a high blackness.

Therefore, there is a strong demand for black magnetic particles capable of exhibiting a high blackness even when incorporated into such a thin coating film.

Hitherto, various attempts have been made in order to obtain magnetite particles having a high blackness (refer to Japanese Patent Application Laid-open (KOKAI) Nos. 5-43253 (1993), 9-59025 (1997) and 3-201509 (1991)).

SUMMARY OF THE INVENTION

In view of the above conventional problems, at present, it has been strongly required to provide black magnetic iron oxide particles in the form of fine particles having a particle size of 0.05 to 0.30 μm and exhibiting an excellent blackness. However, such black magnetic iron oxide particles have not been provided until now.

The magnetite particles described in Japanese Patent Application Laid-open (KOKAI) No. 5-43253 (1993) have failed to exhibit a sufficient blackness when incorporated into a thin coating film.

The magnetite particles described in Japanese Patent Application Laid-open (KOKAI) No. 9-59025 (1997) also have failed to exhibit a sufficient blackness because sulfur element is present over a whole part of the particles.

In addition, the magnetite particles described in Japanese Patent Application Laid-open (KOKAI) No. 3-201509 (1991) also have failed to exhibit a sufficient blackness.

To solve these problems, an object of the present invention is to provide black magnetic iron oxide particles in which when a percentage of dissolution of iron element based on a total amount of iron element contained therein is 50%, a percentage of dissolution of sulfur element based on a total amount of sulfur element contained therein is less than 40%, and which each have a polyhedral shape and are suitably used in a magnetic toner having an excellent blackness even when incorporated into a coating film having a thin thickness.

The above object of the present invention can be accomplished by the following aspects of the present invention.

That is, the present invention provides black magnetic iron oxide particles each containing sulfur, having a polyhedral shape and having such a property that when a percentage of dissolution of iron element based on a total amount of iron element contained in the black magnetic iron oxide particles is 50%, a percentage of dissolution of sulfur element based on a total amount of sulfur element contained in the black magnetic iron oxide particles is less than 40% (first aspect).

Also, the present invention provides the black magnetic iron oxide particles of the first aspect wherein a sulfur content in the black magnetic iron oxide particles is 0.02 to 0.50% by weight (second aspect).

In addition, the present invention provides the black magnetic iron oxide particles of the first or second aspect wherein a specific surface area Sv ($m^2/g$) of the black magnetic iron oxide particles satisfies the following formula:

$$Sv < 2/X$$

wherein X is an average particle diameter (μm) of the black magnetic iron oxide particles (third aspect).

Further, the present invention provides the black magnetic iron oxide particles of any one of the above aspects wherein the black magnetic iron oxide particles contain a carbon element in an amount of 0.005 to 0.5% by weight (fourth aspect).

Further, the present invention provides the black magnetic iron oxide particles of any one of the above aspects wherein Al, or Al and Si, are present in the vicinity of and/or on a surface of the respective black magnetic iron oxide particles, the Al being present in an amount of 0.02 to 1.0% by weight and the Si being present in an amount of 0.02 to 1.0% by weight (fifth aspect).

Further, the present invention provides the black magnetic iron oxide particles of any one of the above aspects wherein a coating film formed by using the black magnetic iron oxide particles as defined in the above first aspect exhibits an a* value of CIELAB color space of not more than 2 when a thickness of the coating film is 23 to 26 μm, and satisfies the following formulae:

$$1 \leq \alpha \leq 1.5 \text{ and}$$

$$1 \leq \beta \leq 2.0,$$

wherein $\alpha = a^*(I)/a^*(II)$; and $\beta = a^*(I)/a^*(III)$ in which $a^*(I)$ is an a* value of the coating film when a thickness of the coating film is 4 to 6 μm; $a^*(II)$ is an a* value of the coating film when a thickness of the coating film is 11 to 13 μm; and $a^*(III)$ is an a* value of the coating film when a thickness of the coating film is 23 to 26 μm.

DETAILED DESCRIPTION OF THE INVENTION

The present invention is described in detail below.

First, the black magnetic iron oxide particles of the present invention are described.

The black magnetic iron oxide particles of the present invention comprises magnetite particles ($(FeO)_x \cdot Fe_2O_3$ wherein $0 < x \leq 1$).

In the black magnetic iron oxide particles of the present invention, sulfur is distributed therein under such a condition that when a percentage of dissolution of iron element based on a total amount of iron element contained in the black magnetic iron oxide particles is 50%, a percentage of dissolution of sulfur element based on a total amount of sulfur element contained in the black magnetic iron oxide particles is less than 40%. When the percentage of dissolution of sulfur element as measured at the percentage of dissolution of iron element of 50% is not less than 40%, the distribution condition of sulfur in the black magnetic iron oxide particles tends to become uniform, thereby failing to obtain black magnetic iron oxide particles having an excellent blackness. The percentage of dissolution of sulfur element as measured at the percentage of dissolution of iron element of 50% is preferably not more than 38% and more preferably not more than 37%. The lower limit of the percentage of dissolution of sulfur element as measured at the percentage of dissolution of iron element of 50% is about 3%.

The black magnetic iron oxide particles of the present invention each have a polyhedral shape. The black magnetic iron oxide particles having a spherical shape tend to fail to exhibit an excellent blackness. The polyhedral shape used herein includes those shapes having the number of constituting faces of not less than 6 and less than 30, for example, a hexahedral shape, an octahedral shape, a dodecahedral shape, a tetradecahedral shape, an octadecahedral shape, a hexacosahedral shape, etc., which all are of an angular shape.

The content of sulfur in the black magnetic iron oxide particles of the present invention is preferably 0.02 to 0.50% by weight. When the content of sulfur in the black magnetic iron oxide particles is less than 0.02% by weight, a coating film having a thickness as thin as from 4 to 6 μm which is formed by using such black magnetic iron oxide particles tends to fail to exhibit a sufficient blackness. When the content of sulfur in the black magnetic iron oxide particles is more than 0.50% by weight, the obtained particles tend to undesirably exhibit a reddish color. The content of sulfur in the black magnetic iron oxide particles is more preferably 0.02 to 0.48% by weight and still more preferably 0.03 to 0.45% by weight.

The average particle diameter (X) of the black magnetic iron oxide particles of the present invention is preferably 0.05 to 0.30 μm. When the average particle diameter (X) of the black magnetic iron oxide particles is less than 0.05 μm, the adhesion force between the particles tends to become too large owing to the increase in number of the particles per unit volume and, therefore, the increase in number of contact points therebetween, so that the resultant magnetic toner tends to be deteriorated in dispersibility in resins. When the average particle diameter (X) of the black magnetic iron oxide particles is more than 0.30 μm, the number of the black magnetic iron oxide particles contained in one toner particle tends to become too small, so that the distribution of the black magnetic iron oxide particles in the respective toner particles tends to be uneven or deflected, resulting in poor uniformity of charging property of the toner particles. The average particle diameter (X) of the black magnetic iron oxide particles is more preferably in the range of 0.08 to 0.28 μm.

The black magnetic iron oxide particles of the present invention preferably have a specific surface area (Sv) satisfying the following formula:

$$Sv < 2/X$$

wherein X is an average particle diameter (μm) of the black magnetic iron oxide particles. When the above relationship between the specific surface area (Sv) and the average particle diameter (X) is not satisfied owing to the existence of impurity phases such as fine yellowish brown particles, the resultant particles tend to fail to exhibit an excellent blackness.

Meanwhile, the specific surface area (Sv) of the black magnetic iron oxide particles of the present invention is preferably 5 to 30 m²/g.

The content of carbon in the black magnetic iron oxide particles of the present invention is preferably 0.005 to 0.5% by weight. When the carbon content is more than 0.5% by weight, the resultant particles tend to be unsuitable for industrial purposes. When the carbon content is less than 0.005% by weight, the resultant particles tend to be deteriorated in heat resistance. The content of carbon in the black magnetic iron oxide particles is more preferably 0.007 to 0.40% by weight.

It is preferred that the black magnetic iron oxide particles of the present invention contain carbon in an amount of 0.005 to 0.5% by weight, and further contain Al, or Al and Si in the vicinity of and/or on the surface of the respective particles such that the Al is present in an amount of 0.02 to 1.0% by weight, preferably 0.05 to 0.80% by weight and the Si is present in an amount of 0 to 1.0% by weight, preferably 0.02 to 0.80% by weight, in order to form a heat-resisting layer on the respective black magnetic iron oxide particles. The inclusion of carbon as well as Al, or Al and Si in the black magnetic iron oxide particles is also preferred to prevent oxidation of the particles upon production of the toner and well maintain a good blackness thereof. When the amount of Al or the amount of Si is more than 1.0% by weight, the amount of water absorbed in the particles tends to be increased, resulting in adverse influence on an environmental stability of the obtained toner. When the amount of Al or the amount of Si is less than 0.02% by weight, the heat-resisting layer formed on the respective particles tends to be unsatisfactory.

In the case where a coating film is formed by using the black magnetic iron oxide particles of the present invention according to the below-mentioned method, the coating film having a thickness of 23 to 26 μm preferably exhibits an a* value of not more than 2.0. When the a* value of the coating film is more than 2.0, the particles tends to fail to exhibit an excellent blackness. The a* value of the coating film having a thickness of 23 to 26 μm which is formed by using the black magnetic iron oxide particles is more preferably less than 1.7.

In the case where a coating film is formed by using the black magnetic iron oxide particles of the present invention according to the below-mentioned method, the coating film preferably satisfies the following formulae:

$$1 \leq \alpha \leq 1.5 \text{ and}$$

$$1 \leq \beta \leq 2.0,$$

wherein $\alpha = a^*(I)/a^*(II)$; and $\beta = a^*(I)/a^*(III)$ in which $a^*(I)$ is an a* value of the coating film when a thickness of the coating film is 4 to 6 μm; $a^*(II)$ is an a* value of the coating film when a thickness of the coating film is 11 to 13 μm; and $a^*(III)$ is an a* value of the coating film when a thickness of the coating film is 23 to 26 μm. When the α and β ratio values are out of the above-specified ranges, the particles tend to fail to exhibit an excellent blackness. The α ratio value is more preferably 1.0 to 1.4 whereas the β ratio value is more preferably 1.0 to 1.8.

The black magnetic iron oxide particles of the present invention have a heat-generation initiating temperature of 120 to 150° C. The black magnetic iron oxide particles having a coating layer made of Al, or Al and Si have a heat-generation initiating temperature of not lower than 130° C.

The black magnetic iron oxide particles of the present invention have a saturation magnetization of 80 to 92 Am²/kg (80 to 92 emu/g), a residual magnetization of 5.0 to 17.0 Am²/kg (5.0 to 17.0 emu/g) and a coercive force of 4.8 to 14.3 kA/m (60 to 180 Oe).

Next, the process for producing the black magnetic iron oxide particles according to the present invention is described.

The black magnetic iron oxide particles of the present invention may be produced by conducting a first stage reaction of mixing a ferrous salt aqueous solution with an aqueous solution containing an alkali hydroxide in an amount of less than 1.00 equivalent on the basis of $Fe^{2+}$ contained in the ferrous salt aqueous solution at a temperature of not lower than 70° C. to produce black magnetic iron oxide particles, and a second stage reaction of mixing a ferrous salt aqueous reaction with an alkali carbonate aqueous solution, or an alkali carbonate aqueous solution and an alkali hydroxide aqueous solution containing the alkali component in a total amount of not less than 1.00 equivalent on the basis of $Fe^{2+}$ contained in the ferrous salt aqueous solution at a temperature of not lower than 70° C., followed by subjecting the resultant reaction product to filtration, washing with water and drying.

In the present invention, when the production process is conducted under the above conditions, a large part of sulfur contained in the particles can be present inside of the particles, and the obtained particles each have a polyhedral shape whose ridges are of an angular configuration, and further a trace amount of carbon can be incorporated in the particles.

Examples of the ferrous salt aqueous solution used in the present invention include a ferrous sulfate aqueous solution, both a ferrous sulfate aqueous solution and a ferrous chloride aqueous solution, etc.

Examples of the alkali hydroxide aqueous solution used in the present invention include an aqueous solution of an alkali metal hydroxide such as sodium hydroxide and potassium hydroxide, and an aqueous solution of an alkali earth metal hydroxide such as magnesium hydroxide and calcium hydroxide.

The amount of the alkali hydroxide aqueous solution used in the first stage reaction is less than 1.00 equivalent and preferably 0.6 to 0.99 equivalent on the basis of $Fe^{2+}$ contained in the ferrous salt aqueous solution. When the amount of the alkali hydroxide aqueous solution used is less than 0.6 equivalent, acicular goethite particles tend to be mixed in the obtained particles. When the amount of the alkali hydroxide aqueous solution used is not less than 1.00 equivalent, the sulfur content in the obtained particles tends to be lowered, thereby failing to obtain the aimed black magnetic iron oxide particles having a high blackness.

The oxidation reaction rate of iron in the first stage reaction 10 to 80%. When the oxidation reaction rate of iron in the first stage reaction is less than 10%, the sulfur content in the obtained particles tends to be lowered, thereby failing to obtain the aimed black magnetic iron oxide particles having good color characteristics. When the oxidation reaction rate of iron in the first stage reaction is more than 80%, the sulfur content in the obtained particles tends to be too large, thereby failing to obtain the aimed black magnetic iron oxide particles having a high blackness.

The reaction temperature used in the first stage reaction is 70 to 100° C. When the reaction temperature is lower than 70° C., acicular goethite particles tend to be mixed in the obtained particles. Even when the reaction temperature is higher than 100° C., magnetite particles may be produced. However, such a high reaction temperature requires a special apparatus such as an autoclave, etc., resulting in industrially disadvantageous process.

The oxidation may be conducted by passing an oxygen-containing gas (for example, air) through the solution.

Examples of the alkali carbonate aqueous solution used in the second stage reaction include aqueous solutions of alkali carbonates such as sodium carbonate, potassium carbonate and ammonium carbonate. Meanwhile, in the second stage reaction, the alkali carbonate aqueous solution may be used in combination with the above alkali hydroxide aqueous solution. In such a case, the molar ratio of the alkali hydroxide aqueous solution to the alkali carbonate aqueous solution is preferably not more than 10.

The total amount of the alkalis used in the second stage reaction may be controlled such that the total amount of the alkali components used in the first stage reaction and the second stage reaction is not less than 1.00 equivalent on the basis of $Fe^{2+}$ contained in the ferrous salt aqueous solution. When the total amount of the alkali components added is less than 1.00 equivalent, a whole amount of $Fe^{2+}$ may not be precipitated. The total amount of the alkali components used in the first stage reaction and the second stage reaction is more preferably 1.00 to 2.00 equivalents. Even when the total amount of the alkali components added is more than 2.00 equivalents, magnetite particles may be produced. However, the use of such a large amount of the alkali component tends to be disadvantageous from the industrial viewpoint.

The reaction temperature used in the second stage reaction may be identical to that used in the first stage reaction. Also, the oxidation of the second stage reaction may be conducted by the same method as used in the first stage reaction.

Meanwhile, between termination of addition of the raw materials and initiation of the first stage reaction, or between termination of the first stage reaction and initiation of the second stage reaction, if required, the reaction mixture may be fully stirred for a predetermined period of time in order to attain a good particle size distribution of the obtained particles.

Also, in the case where Al, or Al and Si are contained in the vicinity of the surface of the respective black magnetic iron oxide particles, at any time subsequent to the time at which the oxidation reaction rate of the ferrous salt reaches 50% in the reaction, a water-soluble aluminum salt or both a water-soluble aluminum salt and a water-soluble silicic acid salt may be added to a suspension containing magnetite core crystal particles such that the amount of Al added is 0.02 to 1.0% by weight and the amount of Si added is 0 to 1.0% by weight, followed by conducting a remaining part of the reaction. In the present invention, the term of "vicinity of the surface of the respective black magnetic iron oxide particles" means a portion formed after the oxidation reaction rate of the ferrous salt reaches 50% in the reaction, namely, means such a portion of 50 wt % from the surface of magnetic iron oxide particle toward to the center thereof.

In addition, in the case where a compound of Al, or Al and Si is formed on the surface of the respective black magnetic iron oxide particles, a water-soluble aluminum salt or both a water-soluble aluminum salt and a water-soluble silicic acid salt are added to a suspension containing the black magnetic iron oxide particles which is obtained after the second stage reaction such that the amount of Al added is 0.02 to 1.0% by weight and the amount of Si added is 0 to 1.0% by weight, and then the pH value of the suspension is adjusted to 5 to 9 to precipitate and deposit Al and Si on the surface of the respective black magnetic iron oxide particles.

If required, at each stage reaction, a salt of at least one element other than iron selected from the group consisting of Mn, Zn, Ni, Cu, Al, Ti and Si may be added to incorporate these elements into the obtained particles. As the salt, there may be used sulfates, nitrates, chlorides, etc. The total amount of the salts added is preferably 0 to 10 atom %, more preferably 0 to 8 atom % and still more preferably 0 to 5 atom % on the basis of Fe.

The black magnetic iron oxide particles of the present invention exhibit a small a* value and an excellent blackness owing to the sulfur distribution and sulfur content in the particles even when incorporated in a thin coating film, so that a magnetic toner formed by using the black magnetic iron oxide particles can also exhibit an excellent blackness.

The black magnetic iron oxide particles of the present invention each have a polyhedral particle shape, and can allow sulfur to be present inside thereof, and therefore can provide magnetite particles having an excellent blackness.

The black magnetic iron oxide particles of the present invention are in the form of fine particles having a particle size of 0.05 to 0.30 μm and exhibit an excellent blackness and, therefore, can be suitably used as magnetic particles for electrophotographic magnetic toner.

The black magnetic iron oxide particles of the present invention are excellent in blackness and, therefore, can be suitably used as magnetic particles for electrophotographic magnetic toner.

EXAMPLES

The present invention is described in more detail by the following typical Examples.

The average particle diameter of the black magnetic iron oxide particles was expressed by an average value of Fere diameters measured by a transmission electron microscope "JEM-100S" manufactured by JEOL Ltd.

The specific surface area was expressed by the value measured by BET method.

The magnetic properties were measured by "Vibration Sample-type Magnetometer VSM-3S-15" (manufactured by TOEI INDUSTRY CO., LTD.) by applying an external magnetic field of 798 kA/m (10 kOe) thereto.

The shape of the particles was observed using a scanning electron microscope "S-800" manufactured by Hitachi Ltd., and a transmission electron microscope "JEM-100S" manufactured by JEOL Ltd.

The content of $Fe^{2+}$ in the black magnetic iron oxide particles was expressed by the value measured by the following chemical analysis method. That is, 25 cc of a mixed solution containing phosphoric acid and sulfuric acid at a mixing ratio of 2:1 was added to 0.5 g of the magnetic particles in an inert gas atmosphere to dissolve the magnetic particles in the solution. After adding several droplets of diphenylamine sulfonic acid as an indicator to a dilute solution of the obtained aqueous solution of the magnetic particles, the resultant solution was subjected to oxidation-reduction titration using an aqueous solution of potassium dichromate. The content of $Fe^{2+}$ was calculated from the amount of the aqueous solution of potassium dichromate used until reacting a terminal point at which the dilute solution exhibited a violet color.

The oxidation reaction rate of the ferrous salt used in the first stage reaction was calculated from the measured content of $Fe^{2+}$ in the reaction solution according to the following formula:

$(A-B) \div A \times 100$ = Oxidation Reaction Rate (%)

wherein A is a content of $Fe^{2+}$ in the reaction solution immediately after mixing the ferrous salt aqueous solution with the alkali aqueous solution; and B is a content of $Fe^{2+}$ in the ferrous salt reaction solution containing ferrous hydroxide and magnetite particles.

The content of sulfur in the black magnetic iron oxide particles was expressed by the value measured by using an inductively coupled plasma atomic emission spectrometer "SPS-4000 Model" manufactured by SII Nano Technology Inc.

The percentage of dissolution of iron element and the percentage of dissolution of sulfur element were determined by the following methods. That is, 30 g of the black magnetic iron oxide particles were suspended in 3 L of a 3 mol/L hydrochloric acid solution. Next, while maintaining the temperature of the hydrochloric acid solution in which the black magnetic iron oxide particles were suspended, at 50° C., the suspension was sampled at constant time intervals until the black magnetic iron oxide particles were completely dissolved therein. The thus sampled solution was filtered through a membrane filter to obtain a filtrate. The thus obtained filtrate was subjected to inductively coupled high-frequency plasma spectrometry (ICP) to determine quantities of the iron element and sulfur element. The percentage of dissolution of iron element and the percentage of dissolution of sulfur element were calculated from the following formula:

Percentage of Dissolution of Iron Element=(concentration (mg/L) of iron element in the sample)/(concentration (mg/L) of iron element in the solution when completely dissolved therein)

Percentage of Dissolution of Sulfur Element=(concentration (mg/L) of sulfur element in the sample)/(concentration (mg/L) of sulfur element in the solution when completely dissolved therein)

The content of carbon in the black magnetic iron oxide particles was determined by measuring the carbon amount using a carbon and sulfur analyzer "EMIA-820" manufactured by Horiba, Ltd.

The heat-generation initiating temperature of the black magnetic iron oxide particles was measured by using a differential scanning calorimeter "DSC6200" manufactured by SII Nano Technology Inc.

The a* value of CIELAB color space of the black magnetic iron oxide particles was determined by the following method.

That is, 8 g of a polyester resin was dissolved in 20 g of toluene. Into the solution obtained by dissolving the polyester resin in toluene were added 8 g of the black magnetic iron oxide particles and 50 g of 1.5 mmφ glass beads, and the resultant mixture was dispersed for 4 hr using a paint conditioner, thereby obtaining a dispersion. The thus obtained dispersion was applied onto a cast coated paper using a bar coater with a bar to form a coating film having a thickness of 12 μm, 40 μm or 100 μm in a wet state. After drying, the color of the resultant coating film was measured by a spectral color density meter "X-rite939".

The thickness of the coating film was determined by the following method.

First, the thickness (A) of the cast coated paper was measured by a digital electron micrometer "K351C" manufactured by Anritsu Corporation. Next, the thickness (B) of the cast coated paper and the coating film formed on the cast coated paper (sum of the thickness of the cast coated paper and the thickness of the coating film) was measured in the same manner as above. The thickness of the coating film was calculated from (B)−(A). The measurement was repeated 30 times, and an average value of the measured thicknesses was regarded as the thickness of the coating film.

Example 1

16 L of a ferrous sulfate aqueous solution containing 1.5 mol/L of $Fe^{2+}$ (total $Fe^{2+}$: 24 mol) was mixed with 14.4 L of a 3.0N sodium hydroxide solution (corresponding to 0.9 equivalent based on $Fe^{2+}$) to produce a ferrous salt suspension. Then, air was passed through the ferrous salt suspension at a flow rate of 70 L/min at 90° C. to conduct an oxidation reaction thereof until an oxidation reaction rate of the ferrous salt reached 30%, thereby obtaining a ferrous salt suspension containing magnetite core crystal particles (first stage reaction).

Next, 3.2 L of a 3.0N sodium carbonate solution (the total amount of the alkalis added as a sum of the sodium carbon solution and the sodium hydroxide solution added in the first stage reaction corresponds to 1.10 equivalents based on 24 mol of $Fe^{2+}$) was added to the ferrous salt suspension containing the magnetite core crystal particles. Then, air was passed through the resultant suspension at a flow rate of 70 L/min at 90° C., thereby producing magnetite particles (second stage reaction).

The thus produced particles were subjected to washing with water, filtration, drying and pulverization by ordinary methods. As a result, it was confirmed that the thus obtained magnetite particles were of a hexacosahedral shape and had an average particle diameter of 0.16 μm, a specific surface area of 7.2 m²/g, a sulfur content of 0.20%, a carbon content of 0.07%, and a percentage of dissolution of sulfur element of 15% as measured at a percentage of dissolution of iron element of 50%.

In addition, it was confirmed that a coating film formed by using the magnetite particles exhibited an a* value of 0.4 when a thickness thereof was 24 μm, and a ratio (α) of an a* value of the coating film having a thickness of 5 μm to an a* value of the coating film having a thickness of 13 μm was 1.0 whereas a ratio (β) of the a* value of the coating film having a thickness of 5 μm to the a* value of the coating film having a thickness of 24 μm was 1.3.

Examples 2 to 8 and Comparative Examples 1 to 4

The same procedure as defined in Example 1 was conducted except that the kind and amount of the alkali aqueous solution used in the first stage reaction, the oxidation reaction rate used upon the first reaction stage, the kind and amount of the alkali aqueous solution used in the second stage reaction, and the amounts of Si and Al added, were changed variously, thereby magnetite particles.

Comparative Example 5

16 L of a ferrous sulfate aqueous solution containing 1.5 mol/L of $Fe^{2+}$ (total $Fe^{2+}$: 24 mol) was mixed with 15.2 L of a 3.0N sodium hydroxide solution (corresponding to 0.95 equivalent based on $Fe^{2+}$) to produce a ferrous salt suspension. In this case, prior to mixing the ferrous sulfate aqueous solution with the sodium hydroxide solution, 150.3 g of a water glass #3 ($SiO_2$: 28.8% by weight; corresponding to 3.00 atom % in terms of Si based on Fe) as a silicon component was added to the sodium hydroxide solution. After controlling a pH value of the above ferrous salt suspension to 8.9 by adding 0.7 L of a 3.0N sodium hydroxide solution thereto, air was passed through the ferrous salt suspension at a flow rate of 70 L/min at 90° C. for 65 min, thereby obtaining a ferrous salt aqueous solution containing magnetite core crystal particles.

Next, 0.3 L of a 3.0N sodium hydroxide solution (corresponding to 3.0 equivalents based on residual $Fe^{2+}$) was added to the ferrous salt suspension containing the magnetite core crystal particles. Then, air was passed through the resultant suspension at a flow rate of 70 L/min at 90° C. for 30 min, thereby producing magnetite particles.

The thus produced magnetite particles were subjected to washing with water, filtration, drying and pulverization by ordinary methods.

Production conditions used above are shown in Table 1, and various properties of the obtained magnetite particles are shown in Table 2.

TABLE 1

| Examples and Comparative Examples | Conditions for first stage reaction | | | |
|---|---|---|---|---|
| | Kind of ferrous salt solution | Alkali hydroxide aqueous solution | | |
| | | Kind | Equivalent ratio of alkali component | Amount (L) |
| Example 1 | Ferrous sulfate | Sodium hydroxide | 0.90 | 14.4 |
| Example 2 | Ferrous sulfate | Sodium hydroxide | 0.80 | 12.8 |
| Example 3 | Ferrous sulfate | Sodium hydroxide | 0.90 | 14.4 |
| Example 4 | Ferrous sulfate | Sodium hydroxide | 0.95 | 15.2 |
| Example 5 | Ferrous sulfate | Sodium hydroxide | 0.97 | 15.5 |
| Example 6 | Ferrous sulfate | Sodium hydroxide | 0.92 | 14.7 |
| Example 7 | Ferrous sulfate | Sodium hydroxide | 0.95 | 15.2 |
| Example 8 | Ferrous sulfate | Sodium hydroxide | 0.99 | 15.8 |
| Comparative Example 1 | Ferrous sulfate | Sodium hydroxide | 0.95 | 15.2 |
| Comparative Example 2 | Ferrous sulfate | Sodium hydroxide | 0.95 | 15.4 |
| Comparative Example 3 | Ferrous sulfate | Sodium hydroxide | 0.50 | 8.0 |
| Comparative Example 4 | Ferrous sulfate | Sodium hydroxide | 0.88 | 14.1 |

| Examples and Comparative Examples | Conditions for first stage reaction | | | | |
|---|---|---|---|---|---|
| | Alkali carbonate aqueous solution | | | Oxidation reaction rate of ferrous salt (%) | Reaction temperature (° C.) |
| | Kind | Equivalent ratio of alkali component | Amount (L) | | |
| Example 1 | — | — | — | 30 | 90 |
| Example 2 | — | — | — | 70 | 90 |
| Example 3 | — | — | — | 20 | 90 |
| Example 4 | — | — | — | 40 | 90 |
| Example 5 | — | — | — | 50 | 90 |
| Example 6 | — | — | — | 45 | 90 |
| Example 7 | — | — | — | 12 | 90 |
| Example 8 | — | — | — | 60 | 90 |
| Comparative Example 1 | Sodium carbonate | 0.15 | 2.4 | 100 | 90 |
| Comparative Example 2 | — | — | — | 95 | 90 |
| Comparative Example 3 | Sodium carbonate | 1.00 | 16 | 100 | 90 |
| Comparative Example 4 | — | — | — | 10 | 90 |

| Examples and Comparative Examples | Conditions for second stage reaction | | | |
|---|---|---|---|---|
| | Alkali hydroxide aqueous solution | | Alkali carbonate aqueous solution | |
| | Kind | Amount (L) | Kind | Amount (L) |
| Example 1 | — | — | Sodium carbonate | 3.2 |
| Example 2 | Sodium hydroxide | 0.3 | Sodium carbonate | 4.0 |
| Example 3 | — | — | Sodium carbonate | 8.0 |
| Example 4 | — | — | Sodium carbonate | 2.0 |
| Example 5 | Sodium hydroxide | 0.2 | Sodium carbonate | 1.0 |

TABLE 1-continued

| | Conditions for second stage reaction | | | |
|---|---|---|---|---|
| Example 6 | Sodium hydroxide | 0.5 | Sodium carbonate | 3.0 |
| Example 7 | Sodium hydroxide | 3.0 | Sodium carbonate | 1.0 |
| Example 8 | Sodium hydroxide | — | Sodium carbonate | 1.0 |
| Comparative Example 1 | — | — | — | — |
| Comparative Example 2 | — | — | Sodium carbonate | 2.5 |
| Comparative Example 3 | — | — | — | — |
| Comparative Example 4 | Sodium hydroxide | 1.8 | — | — |

| Examples and Comparative Examples | Conditions for second stage reaction | | |
|---|---|---|---|
| | Equivalent ratio of total alkalis | Reaction temperature (° C.) | Si content (wt %) |
| Example 1 | 1.10 | 90 | — |
| Example 2 | 1.07 | 90 | — |
| Example 3 | 1.40 | 90 | — |
| Example 4 | 1.08 | 90 | — |
| Example 5 | 1.05 | 90 | 0.1 |
| Example 6 | 1.14 | 90 | 0.1 |
| Example 7 | 1.20 | 90 | — |
| Example 8 | 1.05 | 90 | — |
| Comparative Example 1 | — | — | — |
| Comparative Example 2 | 1.12 | 90 | — |
| Comparative Example 3 | — | — | — |
| Comparative Example 4 | 0.994 | — | — |

| Examples and Comparative Examples | Conditions for second stage reaction | | |
|---|---|---|---|
| | Oxidation reaction rate of ferrous salt upon addition of Si (%) | Al content (wt %) | Oxidation reaction rate of ferrous salt upon addition of Al (%) |
| Example 1 | — | — | — |
| Example 2 | — | — | — |
| Example 3 | — | — | — |
| Example 4 | — | 0.3 | 60 |
| Example 5 | 80 | 0.2 | 80 |
| Example 6 | 100 | 0.2 | 100 |
| Example 7 | — | — | — |
| Example 8 | — | — | — |
| Comparative Example 1 | — | — | — |
| Comparative Example 2 | — | — | — |
| Comparative Example 3 | — | — | — |
| Comparative Example 4 | — | — | — |

TABLE 2

| Examples and Comparative Examples | Properties of magnetic iron oxide particles | | | |
|---|---|---|---|---|
| | Kind | Particle shape | Average particle diameter (X) (μm) | Specific surface area (Sv) (m²/g) |
| Example 1 | Magnetite | Hexacosahedral | 0.16 | 7.2 |
| Example 2 | Magnetite | Icosahedral to triacontahedral | 0.10 | 13.0 |
| Example 3 | Magnetite | Decahedral to icosahedral | 0.13 | 9.2 |
| Example 4 | Magnetite | Hexacosahedral | 0.20 | 6.4 |
| Example 5 | Magnetite | Icosahedral to triacontahedral | 0.25 | 5.5 |
| Example 6 | Magnetite | Icosahedral to triacontahedral | 0.15 | 7.9 |
| Example 7 | Magnetite | Octahedral | 0.14 | 8.6 |
| Example 8 | Magnetite | Hexahedral | 0.17 | 7.0 |
| Comparative Example 1 | Magnetite | Decahedral to icosahedral | 0.19 | 8.0 |
| Comparative Example 2 | Magnetite | Spherical | 0.15 | 11.0 |
| Comparative Example 3 | Magnetite | Icosahedral to triacontahedral | 0.21 | 24.0 |
| Comparative Example 4 | Magnetite | Hexahedral | 0.15 | 8.5 |
| Comparative Example 5 | Magnetite | Spherical | 0.20 | 12.9 |

| Examples and Comparative Examples | Properties of magnetic iron oxide particles | | | |
|---|---|---|---|---|
| | 2/X | Sulfur content (wt %) | Percentage of dissolution of sulfur element as measured at a percentage of dissolution of iron element of 50% (%) | Carbon content (wt %) |
| Example 1 | 12.5 | 0.20 | 15 | 0.07 |
| Example 2 | 20.0 | 0.40 | 36 | 0.03 |
| Example 3 | 15.4 | 0.09 | 10 | 0.11 |
| Example 4 | 10.0 | 0.20 | 18 | 0.05 |
| Example 5 | 8.0 | 0.25 | 31 | 0.05 |
| Example 6 | 13.3 | 0.30 | 27 | 0.07 |
| Example 7 | 14.3 | 0.07 | 7 | 0.09 |
| Example 8 | 11.8 | 0.27 | 31 | 0.04 |
| Comparative Example 1 | 10.5 | 0.007 | 51 | 0.20 |
| Comparative Example 2 | 13.3 | 0.71 | 47 | 0.003 |
| Comparative Example 3 | 9.5 | 0.01 | 47 | 0.19 |
| Comparative Example 4 | 13.3 | 0.35 | 43 | 0.003 |
| Comparative Example 5 | 10.0 | 0.09 | 44 | 0.003 |

| Examples and Comparative Examples | Properties of magnetic iron oxide particles Color characteristics of coating film | | | |
|---|---|---|---|---|
| | Properties of coating film having a thickness of 4 to 6 μm | | Properties of coating film having a thickness of 11 to 13 μm | |
| | a* (I) | Thickness (mm) | a* (II) | Thickness (mm) |
| Example 1 | 0.5 | 5 | 0.5 | 13 |
| Example 2 | 1.5 | 4 | 1.4 | 12 |
| Example 3 | 0.9 | 6 | 0.7 | 12 |
| Example 4 | 0.4 | 5 | 0.3 | 11 |
| Example 5 | 0.3 | 5 | 0.3 | 12 |
| Example 6 | 0.6 | 4 | 0.5 | 13 |
| Example 7 | 0.8 | 4 | 0.6 | 12 |
| Example 8 | 0.5 | 5 | 0.5 | 11 |
| Comparative Example 1 | 1.9 | 5 | 1.2 | 12 |
| Comparative Example 2 | 5.3 | 6 | 2.7 | 13 |
| Comparative Example 3 | 5.6 | 5 | 3.7 | 11 |
| Comparative Example 4 | 4.8 | 4 | 2.5 | 12 |
| Comparative Example 5 | 5.1 | 5 | 3 | 11 |

TABLE 2-continued

Properties of magnetic iron oxide particles
Color characteristics of coating film

| Examples and Comparative Examples | Properties of coating film having a thickness of 23 to 26 μm | | | |
|---|---|---|---|---|
| | a* (III) | Thickness (mm) | α = a* (I)/a* (II) | β = a* (I)/a* (III) |
| Example 1 | 0.4 | 24 | 1.0 | 1.3 |
| Example 2 | 1.2 | 25 | 1.1 | 1.3 |
| Example 3 | 0.6 | 23 | 1.3 | 1.5 |
| Example 4 | 0.3 | 26 | 1.3 | 1.3 |
| Example 5 | 0.3 | 25 | 1.0 | 1.0 |
| Example 6 | 0.4 | 24 | 1.2 | 1.5 |
| Example 7 | 0.5 | 25 | 1.3 | 1.6 |
| Example 8 | 0.4 | 24 | 1.0 | 1.3 |
| Comparative Example 1 | 0.5 | 25 | 1.6 | 3.8 |
| Comparative Example 2 | 2.4 | 26 | 2.0 | 2.2 |
| Comparative Example 3 | 2.5 | 24 | 1.5 | 2.2 |
| Comparative Example 4 | 1.3 | 25 | 1.9 | 3.7 |
| Comparative Example 5 | 2.1 | 24 | 1.7 | 2.4 |

| Examples and Comparative Examples | Properties of magnetic iron oxide particles | | |
|---|---|---|---|
| | Saturation magnetization (Am²/kg) | Residual magnetization (Am²/kg) | Coercive force (kA/m) |
| Example 1 | 88.3 | 10.5 | 8.8 |
| Example 2 | 87.0 | 14.2 | 11.3 |
| Example 3 | 87.2 | 12.4 | 9.5 |
| Example 4 | 87.5 | 9.9 | 8.2 |
| Example 5 | 88.5 | 9.0 | 7.6 |
| Example 6 | 88.0 | 10.9 | 9.2 |
| Example 7 | 87.0 | 15.1 | 12.7 |
| Example 8 | 87.3 | 11.1 | 8.8 |
| Comparative Example 1 | 87.1 | 10.9 | 9.5 |
| Comparative Example 2 | 88.5 | 9.5 | 7.2 |
| Comparative Example 3 | 83.1 | 11.0 | 9.6 |
| Comparative Example 4 | 86.1 | 11.2 | 8.8 |
| Comparative Example 5 | 85.9 | 9.4 | 10.0 |

| Examples and Comparative Examples | Properties of magnetic iron oxide particles | | |
|---|---|---|---|
| | Si content (wt %) | Al content (wt %) | Heat-generation initiating temperature (° C.) |
| Example 1 | — | — | 145 |
| Example 2 | — | — | 132 |
| Example 3 | — | — | 140 |
| Example 4 | — | 0.29 | 184 |
| Example 5 | 0.10 | 0.19 | 183 |
| Example 6 | 0.09 | 0.20 | 172 |
| Example 7 | — | — | 140 |
| Example 8 | — | — | 144 |
| Comparative Example 1 | — | — | 139 |
| Comparative Example 2 | — | — | 129 |
| Comparative Example 3 | — | — | 140 |
| Comparative Example 4 | — | — | 125 |
| Comparative Example 5 | 0.92 | — | 127 |

What is claimed is:

1. Black magnetic iron oxide particles having a particle size of 0.05 to 0.30 μm and each containing sulfur distributed therein, having a polyhedral shape and having such a property that when a percentage of dissolution of iron element based on a total amount of iron element contained in the black magnetic iron oxide particles is 50%, a percentage of dissolution of sulfur element based on a total amount of sulfur element contained in the black magnetic iron oxide particles is less than 40%.

2. Black magnetic iron oxide particles according to claim 1, wherein a sulfur content in the black magnetic iron oxide particles is 0.02 to 0.50% by weight.

3. Black magnetic iron oxide particles according to claim 1, wherein the black magnetic iron oxide particles contain a carbon element in an amount of 0.005 to 0.5% by weight.

4. Black magnetic iron oxide particles according to claim 1, wherein Al, or Al and Si, are present in the vicinity of and/or on a surface of the respective black magnetic iron oxide particles, the Al being present in an amount of 0.02 to 1.0% by weight and the Si being present in an amount of 0.02 to 1.0% by weight.

5. Black magnetic iron oxide particles having a particle size of 0.05 to 0.30 μm and each containing sulfur distributed therein, having a polyhedral shape and having such a property that when a percentage of dissolution of iron element based on a total amount of iron element contained in the black magnetic iron oxide particles is 50%, a percentage of dissolution of sulfur element based on a total amount of sulfur element contained in the black magnetic iron oxide particles is less than 40%;

wherein a coating film formed by using the black magnetic iron oxide particles exhibits an a* value of CIELAB color space of not more than 2 when a thickness of the coating film is 23 to 26 μm, and satisfies the following formulae:

$1 \leq \alpha \leq 1.5$ and $1 \leq \beta \leq 2.0$, wherein $\alpha = a^*(I)/a^*(II)$; and $\beta = a^*(I)/a^*(III)$ in which $a^*(I)$ is an a* value of the coating film when a thickness of the coating film is 4 to 6 μm; $a^*(II)$ is an a* value of the coating film when a thickness of the coating film is 11 to 13 μm; and $a^*(III)$ is an a* value of the coating film when a thickness of the coating film is 23 to 26 μm.

* * * * *